US012625090B2

(12) United States Patent
Ruoff et al.

(10) Patent No.:  US 12,625,090 B2
(45) Date of Patent:       May 12, 2026

(54) IMAGING OPTICAL ARRANGEMENT TO IMAGE AN OBJECT ILLUMINATED BY X-RAYS

(71) Applicants:Carl Zeiss SMT GmbH, Oberkochen (DE); Carl Zeiss X-ray Microscopy Inc., Dublin, CA (US)

(72) Inventors: Johannes Ruoff, Aalen (DE); Juan Atkinson Mora, Hillsboro, OR (US); Thomas Anthony Case, Walnut Creek, CA (US); Heiko Feldmann, Aalen (DE); Christoph Hilmar Graf vom Hagen, Schwäbisch Gmünd (DE); Thomas Matthew Gregorich, Milpitas, CA (US); Gerhard Krampert, Pleasanton, CA (US)

(73) Assignees: Carl Zeiss SMT GmbH, Oberkochen (DE); Carl Zeiss X-ray Microscopy Inc., Dublin, CA (US)

( * ) Notice: Subject to any disclaimer, the term of this patent is extended or adjusted under 35 U.S.C. 154(b) by 67 days.

(21) Appl. No.: 18/443,385

(22) Filed: Feb. 16, 2024

(65) Prior Publication Data

US 2024/0295507 A1     Sep. 5, 2024

Related U.S. Application Data

(63) Continuation of application No. PCT/EP2022/070678, filed on Jul. 22, 2022, which is
(Continued)

(30) Foreign Application Priority Data

Sep. 15, 2021   (DE) .......................... 102021210174.7
Sep. 15, 2021   (DE) .......................... 102021210175.5

(51) Int. Cl.
*G01N 23/04*          (2018.01)
*G01N 23/083*        (2018.01)

(52) U.S. Cl.
CPC ........... *G01N 23/04* (2013.01); *G01N 23/083* (2013.01); *G01N 2223/505* (2013.01)

(58) Field of Classification Search
CPC . G01N 23/04; G01N 23/083; G01N 2223/505
See application file for complete search history.

(56) References Cited

U.S. PATENT DOCUMENTS 5,012,498 A     4/1991   Cuzin et al.
5,365,566 A     11/1994  Maas
(Continued)

FOREIGN PATENT DOCUMENTS

CN       106257323 B      4/2019
DE        4228082          9/1993
(Continued)

OTHER PUBLICATIONS

Office Action issued by the Japanese Patent Office for Application No. JP 2024-510226, dated Jan. 16, 2025 (with English Translation).
(Continued)

*Primary Examiner* — Hugh Maupin
(74) *Attorney, Agent, or Firm* — Fish & Richardson P.C.

(57)            ABSTRACT

An imaging optical arrangement serves to image an object illuminated by X-rays. An imaging optics serves to image a transfer field in a field plane into a detection field in a detection plane. A layer of scintillator material is arranged at the transfer field. A stop is arranged in a pupil plane of the imaging optics. The imaging optics has an optical axis. A center of a stop opening of the stop is arranged at a decentering distance with respect to the optical axis. Such imaging optical arrangement ensures a high quality imaging
(Continued)

of the object irrespective of a tilt of X-rays entering the transfer field. The imaging optical arrangement is part of a detection assembly further comprising a detection array and an object mount. Such detection assembly is part of a detection system further comprising an X-ray source.

41 Claims, 6 Drawing Sheets

Related U.S. Application Data a continuation-in-part of application No. 17/402,819, filed on Aug. 16, 2021, now Pat. No. 12,040,103, and a continuation-in-part of application No. 17/402,822, filed on Aug. 16, 2021, now Pat. No. 11,817,231.

(56) References Cited

U.S. PATENT DOCUMENTS

| | | | | |
|---|---|---|---|---|
| 5,461,653 | A | * | 10/1995 | Parker .................... G21K 1/025 |
| | | | | 378/22 |
| 5,864,599 | A | * | 1/1999 | Cowan .................... G21K 7/00 |
| | | | | 378/43 |
| 6,327,329 | B1 | * | 12/2001 | Bromberg ............ G01N 23/046 |
| | | | | 378/19 |
| 6,774,983 | B2 | | 8/2004 | Kuchibhotla |
| 7,057,187 | B1 | | 6/2006 | Yun et al. |
| 7,130,375 | B1 | | 10/2006 | Yun et al. |
| 7,260,171 | B1 | * | 8/2007 | Arenson ................. G21K 1/04 |
| | | | | 378/19 |
| 8,571,175 | B2 | | 10/2013 | Clemen, Jr. et al. |
| 8,971,483 | B2 | | 3/2015 | Sasaki et al. |
| 9,129,715 | B2 | | 9/2015 | Adler et al. |
| 10,014,153 | B2 | | 7/2018 | Kohhno |
| 10,295,485 | B2 | | 5/2019 | Yun et al. |
| 10,324,050 | B2 | | 6/2019 | Hench et al. |
| 10,606,048 | B2 | | 3/2020 | Ruoff et al. |
| 10,692,184 | B2 | | 6/2020 | Ratner et al. |
| 10,722,192 | B2 | | 7/2020 | Erler et al. |
| 11,009,471 | B2 | | 5/2021 | Muehlhauser |
| 11,042,981 | B2 | | 6/2021 | Adler et al. |
| 11,430,118 | B2 | | 8/2022 | Adler et al. |
| 11,615,533 | B2 | | 3/2023 | Adler et al. |
| 11,651,492 | B2 | | 5/2023 | Adler et al. |
| 11,688,067 | B2 | | 6/2023 | Adler et al. |
| 11,817,231 | B2 | | 11/2023 | Ruoff et al. |
| 12,040,103 | B2 | * | 7/2024 | Ruoff .................... G01N 23/046 |

| | | | | |
|---|---|---|---|---|
| 2003/0021376 | A1 | | 1/2003 | Smith |
| 2003/0223536 | A1 | * | 12/2003 | Yun ........................ G21K 1/062 |
| | | | | 378/45 |
| 2004/0027550 | A1 | | 2/2004 | Kuchibhotla |
| 2007/0108387 | A1 | * | 5/2007 | Yun ...................... G01N 23/223 |
| | | | | 250/345 |
| 2010/0158196 | A1 | * | 6/2010 | Born ...................... G21K 1/025 |
| | | | | 29/428 |
| 2012/0154823 | A1 | | 6/2012 | Sakamoto |
| 2015/0270023 | A1 | | 9/2015 | Adler |
| 2016/0088205 | A1 | | 3/2016 | Horstmeyer et al. |
| 2016/0202193 | A1 | | 7/2016 | Hench et al. |
| 2017/0131528 | A1 | | 5/2017 | Ruoff et al. |
| 2017/0236684 | A1 | | 8/2017 | Kohno |
| 2017/0311919 | A1 | * | 11/2017 | Gagnon ................. A61B 6/482 |
| 2018/0059260 | A1 | * | 3/2018 | Malone ................. G01T 1/2002 |
| 2018/0164690 | A1 | | 6/2018 | Ruoff et al. |
| 2019/0231286 | A1 | | 8/2019 | Erler et al. |
| 2020/0170598 | A1 | * | 6/2020 | Shea .................... A61B 6/4417 |
| 2021/0012499 | A1 | | 1/2021 | Adler et al. |
| 2023/0050439 | A1 | | 2/2023 | Ruoff et al. |

FOREIGN PATENT DOCUMENTS

| | | | | |
|---|---|---|---|---|
| DE | 102018209570 | 12/2018 | | |
| DE | 102018201250 | 6/2019 | | |
| JP | S62-259454 | 11/1987 | ............. | H01L 21/66 |
| JP | H07-303628 | 11/1995 | ............. | A61B 6/02 |
| JP | 2008-185717 | 8/2008 | ............. | G03B 9/02 |

OTHER PUBLICATIONS

International Search Report and Written Opinion for International Application No. PCT/EP2022/070678, dated Oct. 21, 2022.

Office Action issued by the German Patent Office for Application No. DE 10 2021 210 174.7 dated Feb. 17, 2022 (with English Machine Translation).

Office Action issued by the German Patent Office for Application No. DE 10 2021 210 175.5 dated Jun. 21, 2022 (with English Machine Translation).

Gondrom et al., Digital computed laminography and tomosynthesis— functional principles and industrial applications, NDT.net, vol. 4, No. 7 (Jul. 1999).

Office Action in Korean Appln. No. 10-2024-7008241, mailed on Sep. 4, 2025, 24 pages (with English translation).

Office Action in Taiwanese Appln. No. 111 130 549, mailed on Jan. 20, 2026, 9 pages (with English translation).

* cited by examiner

8ba
8bc
8e 8b
8bb
8f 8bd 30a
30
9
2
3
8
8a
8b
8i
1
12, 13
P d
10
4
4i
7
8d
18, 25
x
z
y
11
8e
8f
5
6 6
8h
31
8g
8c

1

IMAGING OPTICAL ARRANGEMENT TO IMAGE AN OBJECT ILLUMINATED BY X-RAYS

CROSS-REFERENCE TO RELATED APPLICATIONS

This application is a continuation of and claims priority under 35 U.S.C. § 120 from PCT Application No. PCT/EP2022/070678, filed on Jul. 22, 2022, which claims priority from U.S. patent application Ser. No. 17/402,819, filed on Aug. 16, 2021, published as US 2023/0050439, U.S. patent application Ser. No. 17/402,822, filed on Aug. 16, 2021, now U.S. Pat. No. 11,817,231, German Patent Application No. 10 2021 210 175.5, filed on Sep. 15, 2021, and German Application No. 10 2021 210 174.7, filed on Sep. 15, 2021. The entire contents of each of these priority applications are incorporated herein by reference.

TECHNICAL FIELD

The invention refers to an imaging optical arrangement to image an object illuminated by X-rays. Further, the invention refers to a detection assembly including such an imaging optical arrangement and to a detection system including such a detection assembly. Further, the invention refers to an X-ray inspection method using such a detection system.

BACKGROUND

An imaging optical arrangement to image an object illuminated by X-rays is known from U.S. Pat. No. 7,057,187 B1, from U.S. Pat. No. 7,130,375 B1 and from U.S. Pat. No. 9,129,715 B2. Further, from DE 10 2018 209 570 A1 a method and a device to produce a three-dimensional image is known. US 2021/0012499 A1 discloses methods and systems for detecting defects in devices using X-rays. In the article of S. Gondrom et al., NDT.net—July 1999, Vol. 4, No. 7, Digital computed laminography and tomosynthesis including functional principles and industrial applications are disclosed. DE 42 28 082 C1 discloses an optical stop. US 2016/0088205 A1 discloses Multiplexed Fourier Ptychography imaging systems and methods. US 2018/0164690 A1 discloses an imaging optical unit for EUV projection lithography. US 2017/0131528 A1 discloses an imaging optical unit for a metrology system for examining a lithography mask. US 2012/0154823 A1 discloses a position detection apparatus, an exposure apparatus and a method of manufacturing.

SUMMARY

In a general aspect, the invention establishes an imaging optical arrangement which enables a high quality imaging of the object irrespective of X-rays entering the transfer field in an oblique or tilted manner.

The above aspect is achieved by an imaging optical arrangement configured to image an object illuminated by X-rays, in which the imaging optical arrangement includes an imaging optics to image a transfer field in a field plane into a detection field in a detection plane via an imaging light path, a layer of scintillator material arranged at the transfer field, and a stop being arranged in a pupil plane of the imaging optics. The imaging optics has an optical axis, and a center of a stop opening of the stop is arranged at a decentering distance with respect to the optical axis.

2

It has been realized by the inventors, that a stop arranged at a decentering distance with respect to the optical axis of the imaging optics of the imaging optical arrangement makes it possible to adapt such decentering distance to an angle of an oblique or tilted entry of X-rays to the transfer field of the imaging optics. With a respective decentering of the stop opening, a mean spot size of the imaging spots of points of origin from different positions of the layer of scintillator material can be kept advantageously small. This gives a good imaging from the transfer field to the detection field even in case of obliquely entering rays on the layer of scintillator material.

The stop opening of the stop of the imaging optical arrangement defines a pupil of the imaging optics.

In particular, it is possible to image object structures, which are smaller than 20 μm, smaller than 10 μm and in particular which are smaller than 1 μm. Examples for such structures are Cu—Cu hybrid bonding structures between microchips and substrate conductor paths. In particular, direct bonds between single dies or between a whole wafer onto a substrate wafer can be inspected.

In particular, a 3D tomographic reconstruction of an object sample under investigation by combining several 2D images taken from different directions is possible.

A decentering distance that is at least 10% of a width of the stop opening has proven to be good adapted to typical space requirements of detection systems and detection assemblies including such an imaging optical arrangement. The decentering distance can be larger than 10% of the stop opening width and can amount to 15%, 20%, 25%, 30%, 35%, 40% or even a larger fraction of the stop opening width. The decentering distance can be a continuous function of an angle of incidence of the X-ray illumination of the object. After measuring such X-ray angle of incidence, for a given imaging optical arrangement, a decentering distance value can be stored, e.g., in a look-up table to be adjusted within the imaging optics.

The stop opening of the stop can be a circular opening. In this case, the width of the stop opening also is its diameter. In case of a non-circular stop opening, the width can be calculated as a mean width measured across all possible directions of the stop opening in the arrangement plane of the stop.

The stop can be mounted on a drive to translate the pupil stop. The pupil stop drive may be a decentering drive to translate the pupil stop laterally along at least one stop decentering direction in the pupil plane. The decentering drive allows an adaption of the decentering distance. The decentering drive can be in signal connection to a control device of the imaging optical arrangement or of a detection assembly or a detection system utilizing the imaging optical arrangement. The control device can then control the action of the decentering drive to translate the stop. Such control can take place depending on another parameter fed to the control device. Such other parameter can be the result of a respective working condition of the imaging optical arrangement, the detection assembly or the detection system or can be the result of a measurement. Alternatively or in addition the pupil stop drive may be an axial drive to translate the pupil stop perpendicular to the pupil plane. Such axial drive may serve as a telecentricity adjustment drive to adjust a telecentricity parameter of the imaging optical arrangement.

An object side NA of the imaging optics which is defined by the stop opening can be larger than 0.4. The object side NA enables an imaging of the object with sufficient resolution. Such object side NA can be 0.45, 0.5, 0.55, 0.6, 1.0, 1.2 or can be even larger. As a rule, such object side NA defined by the stop opening is smaller than 1.8. The object side numerical aperture can be larger than 1.0 since the scintillator material can have a refractive index which is larger than 1.0.

The imaging optical arrangement may further comprise means for adjusting a chief ray property, such means including either a moveable optical element or means to axially move the stop.

The stop may be an annular pupil stop.

In another general aspect, a detection assembly includes an imaging optical arrangement configured to image an object illuminated by X-rays, in which the imaging optical arrangement includes an imaging optics to image a transfer field in a field plane into a detection field in a detection plane via an imaging light path, a layer of scintillator material arranged at the transfer field, and a stop being arranged in a pupil plane of the imaging optics. The imaging optics has an optical axis, and a center of a stop opening of the stop is arranged at a decentering distance with respect to the optical axis. The detection assembly further includes a detection array arranged at the detection field of the imaging optics, and an object mount to hold an object to be imaged via the imaging optics.

The advantages of a detection assembly described above correspond to those discussed above with respect to the imaging optical arrangement. The detection array, the imaging optics and the object mount of the detection assembly can be mounted in fixed relationship.

In another general aspect, a detection system includes a detection assembly that includes an imaging optical arrangement configured to image an object illuminated by X-rays. The imaging optical arrangement includes an imaging optics to image a transfer field in a field plane into a detection field in a detection plane via an imaging light path, a layer of scintillator material arranged at the transfer field, and a stop being arranged in a pupil plane of the imaging optics. The imaging optics has an optical axis, and a center of a stop opening of the stop is arranged at a decentering distance with respect to the optical axis. The detection assembly further includes a detection array arranged at the detection field of the imaging optics, and an object mount to hold an object to be imaged via the imaging optics. The detection system further includes an X-ray source.

The advantages of a detection system described above correspond to those discussed above with respect to the imaging optical arrangement and with respect to the detection assembly.

X-ray energies of the used X-rays can range between 5 keV and 160 keV, preferably between 15 keV and 90 keV.

The detection system can include a lateral displacement drive for relative lateral displacement of the object mount with respect to the X-ray source. The lateral displacement drive enables an automatic imaging measurement of the object with high quality. An imaging method which can be used utilizing such lateral displacement drive is disclosed in DE 10 2018 209 570 A1, the entire content of which is incorporated by reference.

During such lateral displacement of the object mount with respect to the X-ray source, a direction of the optical axis of the imaging optics can remain unchanged, i.e. may not be tilted. In particular, during lateral displacement of the object mount, the object and the imaging optical arrangement can remain in fixed spatial relationship.

Balancing of the lateral displacement of the X-ray source with respect to the optical mount on the one hand and with the stop opening decentering on the other, enables high quality imaging with low mean effective spot sizes of the imaging of the transfer field to the detection field despite the fact that imaging light is produced over the whole thickness of the scintillator material perpendicular to the transfer field plane via a X-ray path, which is oblique or tilted with respect to a normal to the transfer field plane. The stop opening decentering involved in the balancing described above can include adjusting the decentering distance of the center of the stop opening with respect to the optical axis of the imaging optics. The chief imaging rays of the imaging light within the imaging optics are defined as the center rays of the light bundles emanating from the scintillator material layer. Alternatively, such chief imaging rays can be defined as those rays which carry the direction of the main imaging light energy.

An angle between the X-rays entering the transfer field and the optical axis of the imaging optics can be between 0 deg and 80 deg. The angle described above has proven to give good imaging results, in particular good three-dimensional imaging results when using a method according to DE 10 2018 209 570 A1. Such angle can be between 10 deg and 30 deg and can be in the range of 20 deg.

The detection system can include a control device that is in signal connection with the decentering drive and with the lateral displacement drive. The control device enables a control of the decentering drive depending on the lateral displacement effected by the lateral displacement drive. This enables an automatic measuring process to produce a three-dimensional image of the object. Data with respect to the dependency between the actions of the decentering drive on the one hand and of the lateral displacement drive on the other can be gathered from a look-up table. Such look-up table can be produced in a preparational calibration step of the detection system.

In another general aspect, an X-ray inspection method uses a detection system that includes a detection assembly including an imaging optical arrangement configured to image an object illuminated by X-rays. The imaging optical arrangement includes an imaging optics to image a transfer field in a field plane into a detection field in a detection plane via an imaging light path, a layer of scintillator material arranged at the transfer field, and a stop being arranged in a pupil plane of the imaging optics. The imaging optics has an optical axis, and a center of a stop opening of the stop is arranged at a decentering distance with respect to the optical axis. The detection assembly further includes a detection array arranged at the detection field of the imaging optics, and an object mount to hold an object to be imaged via the imaging optics. The detection system further includes an X-ray source. The decentering distance of the stop opening of the stop is adapted to an angle of an oblique or tilted entry of X-rays to the transfer field of the imaging optics. Advantages of the X-ray inspection method described above correspond to those discussed above with respect to the detection system.

The detection system can comprise a shield stop having a shield stop aperture transmissive for the X-rays used to image the object, the shield stop being arranged in an arrangement plane in a light path of the X-rays between the X-ray source and the object mount, the shield stop being movable via a shield stop displacement drive along at least one stop displacement direction in the arrangement plane. The shield stop and the detection array can be moved synchronously relative to the object to be inspected to realize different object imaging projections.

Synchronous movement of the shield stop, the detection array and the object ensures that a used light path of the X-rays to illuminate the object always impinges on the object at a desired object region to be imaged to result in the desired object imaging projection.

According to another general aspect which may be realized alternatively or in addition to those aspects mentioned above which together with a further aspect mentioned below is denoted as additional general aspect, the invention optimizes an X-Ray illumination of the object giving in particular the possibility to achieve a high-resolution object imaging.

The aspect described above is achieved by a detection system that includes an X-ray source for generating X-rays, and an imaging optical arrangement to image the object in an object plane illuminated by the X-rays, the imaging optical arrangement including an imaging optics to image a transfer field in a field plane into a detection field in a detection plane. The detection system includes a detection array, arranged at the detection field of the imaging optics, and an object mount to hold the object to be imaged via the imaging optics, in which the object mount is movable relative to the light source via an object displacement drive along at least one lateral object displacement direction in the object plane. The detection system includes a shield stop having a shield stop aperture transmissive for the X-rays used to image the object, the shield stop being arranged in an arrangement plane in a light path of the X-rays between the X-ray source and the object mount, the shield stop being movable via a shield stop displacement drive along at least one stop displacement direction in the arrangement plane. The detection system includes a control device having a drive control unit being in signal connection with the shield stop displacement drive and with the object displacement drive for synchronizing a movement of the shield stop displacement drive and the object displacement drive.

A movable shield stop gives the possibility to safeguard that only those regions of the object are illuminated with the X-rays which are imaged by the imaging optical arrangement. Uninspected optic regions, i.e. those regions of the object which actually are not imaged by the imaging optical arrangement, then are protected from unnecessary X-ray exposure. In some implementations, a synchronized movement of the shield stop displacement drive and of the object displacement drive ensures that a used light path of the X-rays to illuminate the object always (or during substantially most of the operating period of the detection system) impinges on the object at a desired object region to be imaged.

In particular, it is possible to image object structures, which are smaller than 20 μm, smaller than 10 μm and in particular which are smaller than 1 μm. Examples for such structures are Cu—Cu hybrid bonding structures between microchips and substrate conductor paths. In particular, direct bonds between single dies or between a whole wafer onto a substrate wafer can be inspected.

In particular, a 3D tomographic reconstruction of an object sample under investigation by combining several 2D images taken from different directions is possible.

X-ray energies of the used X-rays can range between 5 keV and 160 keV, preferably between 15 and 90 keV.

In some implementations, the object mount can be movable along at least one linear displacement direction. The shield stop is movable along at least one linear displacement direction. The object mount/shield stop movability described above have proven to be particularly advantageous to acquire a high-resolution object image. The object mount can be movable along two lateral displacement directions. Such two displacement directions can span up the object plane. The shield stop can be movable along two lateral displacement directions. Such two displacement directions can span up the shield stop arrangement plane.

In some implementations, the object mount and/or the shield stop is movable along at least one circular direction. The above-mentioned advantages also hold for movable variants in at least one circular direction as described above.

In some implementations, a shield stop having a shield stop aperture being variable in size enables an adaption of the field stop size to the requirements, which are to be met by the used X-ray path to impinge on the object region to be imaged. Such variability in size can be realized by an iris stop. The shield stop having a shield stop aperture with variable size can be equipped with an aperture variation drive. Such aperture variation drive also can be in signal connection with the drive control unit of the control device. The aperture size controlled via the aperture variation drive can depend on the positions of the shield stop displacement drive and/or of the object displacement drive.

The shield stop can include several shield blades. An embodiment of the shield stop described above can have a relatively simple structure. The shield blades can be movable relative to each other to enable a variable shield stop aperture size. The several shield blades can be arranged as at least one pair or as several pairs of shield blades. In case two pairs of shield blades are used, these can be oriented 90 deg to each other to give, e.g., the possibility to result in a square or in a rectangular shield stop aperture.

In some implementations, the shield stop aperture can be equipped with a filter. A filter described above gives the possibility to filter out undesired wavelengths and/or debris.

In some implementations, the detection system can include a shield stop exchange mount to exchange between different shield stops. The shield stop exchange mount described above can facilitate an exchange between different shield stops. This can be used to replace a worn-out shield stop or to adapt a shield stop aperture size.

In some implementations, the detection system can include a layer of scintillator material arranged at the transfer field. The layer of scintillator material described above enables a good imaging from the transfer field to the detection field.

In some implementations, the detection system can include a pupil stop being arranged in a pupil plane of the imaging optics. The pupil stop described above enables an adaption, in particular of a numerical aperture of the imaging optics, to imaging requirements of the detection system.

This in particular holds for a pupil stop that is movable via a pupil stop decentering drive to translate the pupil stop in the pupil plane. In particular, it has been realized by the inventors, that a stop arranged at a decentering distance with respect to the optical axis of the imaging optics of the imaging optical arrangement makes it possible to adapt such decentering distance to an angle of an oblique or tilted entry of X-rays to the transfer field of the imaging optics. With a respective decentering of the stop opening, a mean spot size of the imaging spots of points of origin from different positions of the layer of scintillator material can be kept advantageously small. This gives a good imaging from the transfer field to the detection field even in case of obliquely entering rays on the layer of scintillator material.

In some implementations, the drive control unit can be in signal connection with the pupil stop decentering drive. The drive control unit described above enables a synchronization of a movement of the shield stop displacement drive, the lateral displacement drive and the pupil stop displacement drive. This enables an automatic measuring process to produce a 3-dimensional image of the object. Data with respect to the dependency between the actions of the shield stop displacement drive, the lateral displacement drive and the pupil stop displacement drive can be gathered from a look-up table. Such look-up table can be produced in a preparational calibration step of the detection system.

In some implementations, the X-ray source can be an open transmissive source or a liquid metal jet source. The X-ray sources described above have proven to be suited for the detection system.

The object mount can be from the type of a ring mount. Such an object mount can have no additional mount material between a used light path and the object. This avoids undesired X-ray absorption.

In some implementations, the object mount can include at least one organic tray or can include an aluminum and/or glass tray, the tray in particular including a dopant to filter a low energy part of a spectrum of the generated X-rays. The object mount described above can minimize an X-ray absorption and/or filter a low, unwanted energy part of the X-ray spectrum.

In another general aspect, an X-ray inspection method is performed using a detection system for X-ray inspection of an object, in which the detection system includes an X-ray source for generating X-rays, and an imaging optical arrangement to image the object in an object plane illuminated by the X-rays, the imaging optical arrangement including an imaging optics to image a transfer field in a field plane into a detection field in a detection plane. The detection system includes a detection array, arranged at the detection field of the imaging optics, and an object mount to hold the object to be imaged via the imaging optics, in which the object mount is movable relative to the light source via an object displacement drive along at least one lateral object displacement direction in the object plane. The detection system includes a shield stop having a shield stop aperture transmissive for the X-rays used to image the object, the shield stop being arranged in an arrangement plane in a light path of the X-rays between the X-ray source and the object mount, the shield stop being movable via a shield stop displacement drive along at least one stop displacement direction in the arrangement plane. The detection system includes a control device having a drive control unit being in signal connection with the shield stop displacement drive and with the object displacement drive for synchronizing a movement of the shield stop displacement drive and the object displacement drive. The shield stop and the detection array are moved synchronously relative to the object to be inspected to realize different object imaging projections. Advantages of the X-ray inspection method described above correspond to those discussed above with respect to the detection system. Synchronous movement of the shield stop, the detection array and the object ensures that a used light path of the X-rays to illuminate the object always (or during substantially most of the operating period of the detection system) impinges on the object at a desired object region to be imaged to result in the desired object imaging projection.

Such additional general aspect further can be described using the following clauses:

1. (Clause 1) A detection system for X-ray inspection of an object, the detection system comprising
    an X-ray source for generating X-rays,
    an imaging optical arrangement to image the object in an object plane illuminated by the X-rays, the imaging optical arrangement comprising an imaging optics to image a transfer field in a field plane into a detection field in a detection plane, a detection array, arranged at the detection field of the imaging optics,
    an object mount to hold the object to be imaged via the imaging optics, wherein the object mount is movable relative to the light source via an object displacement drive along at least one lateral object displacement direction in the object plane,
    a shield stop having a shield stop aperture transmissive for the X-rays used to image the object, the shield stop being arranged in an arrangement plane in a light path of the X-rays between the X-ray source and the object mount, the shield stop being movable via a shield stop displacement drive along at least one stop displacement direction in the arrangement plane,
    a control device having a drive control unit being in signal connection with the shield stop displacement drive and with the object displacement drive for synchronizing a movement of the shield stop displacement drive and the object displacement drive.

2. (Clause 2) The detection system of clause 1, wherein the object mount is movable along at least one linear displacement direction.

3. (Clause 3) The detection system of clause 1, wherein the shield stop is movable along at least one linear displacement direction.

4. (Clause 4) The detection system of clause 1, wherein the object mount and/or the shield stop is movable along at least one circular direction.

5. (Clause 5) The detection system of clause 1, wherein the shield stop is configured such that the shield stop aperture is variable in size.

6. (Clause 6) The detection system of clause 1, wherein the shield stop comprises several shield blades.

7. (Clause 7) The detection system of clause 1, wherein the shield stop aperture is equipped with a filter.

8. (Clause 8) The detection system of clause 1, comprising a shield stop exchange mount to exchange between different shield stops.

9. (Clause 9) The detection system of clause 1, comprising a layer of scintillator material arranged at the transfer field.

10. (Clause 10) The detection system of clause 1, comprising a pupil stop being arranged in a pupil plane of the imaging optics.

11. (Clause 11) The detection system of clause 10, wherein the pupil stop is movable via a pupil stop decentering drive to translate the pupil stop in the pupil plane.

12. (Clause 12) The detection system of clause 11, wherein the drive control unit is in signal connection with the pupil stop decentering drive.

13. (Clause 13) The detection system of clause 1, wherein the X-ray source is an open transmissive source or a liquid metal jet source.

14. (Clause 14) The detection system of clause 1, wherein the object mount includes at least one organic tray or includes an aluminum and/or glass tray, the tray in particular including a dopant to filter a low energy part of a spectrum of the generated X-rays.

15. (Clause 15) An X-ray inspection method using a detection system of clause 1, wherein the shield stop and the detection array are moved synchronously relative to the object to be inspected to realize different object imaging projections.

16. (Clause 16) The X-ray inspection method of clause 15, comprising moving the object mount along at least one linear displacement direction.

17. (Clause 17) The X-ray inspection method of clause 15, comprising moving the shield stop along at least one linear displacement direction.

18. (Clause 18) The X-ray inspection method of clause 15, comprising moving the object mount and/or the shield stop along at least one circular direction.

19. (Clause 19) The X-ray inspection method of clause 15, comprising reading data from a look-up table that stores data with respect to a dependency between actions of the shield stop displacement drive and actions of the object displacement drive, and using the data from the lookup table to synchronize the movement of the shield stop displacement drive and the object displacement drive.

20. (Clause 20) The detection system of clause 1, comprising a lookup table that stores data with respect to a dependency between actions of the shield stop displacement drive and actions of the object displacement drive, wherein the control device is configured to use the data stored in the lookup table to synchronize the movement of the shield stop displacement drive and the object displacement drive.

Components and functions of this additional general aspect may be combined with those of the general aspects mentioned above.

BRIEF DESCRIPTION OF DRAWINGS

Exemplified embodiments of the invention hereinafter are described with reference to the accompanying figures. In these show.

DETAILED DESCRIPTION

Figures 1, 1A:
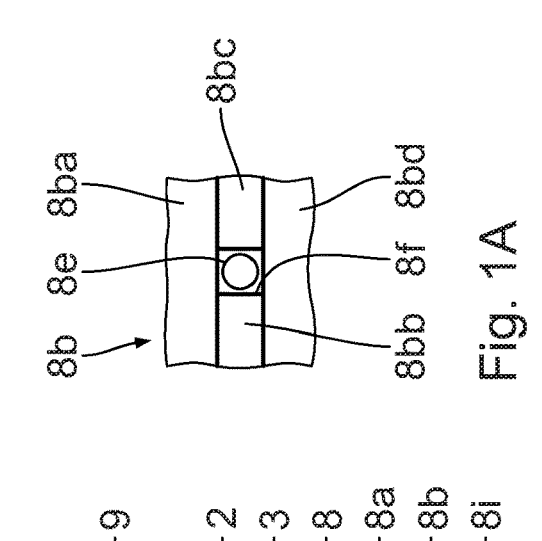
FIG. 1 partly schematical and partly in a perspective depiction a side-view of a detection system including a detection assembly having an imaging optical arrangement to image an object illuminated by X-rays embodied as a microscope objective shown in a first position of the detection assembly including an object mount relative to an X-ray source of the detection system, the detection system further including a shield stop between a source region of the X-ray source and the object mount.
FIG. 1A is an insert of FIG. 1 showing a plane xy-view of the shield stop.

A detection system 1 serves to investigate or inspect an object 2 which is illuminated by X-rays 3. The detection system 1 in particular serves to investigate the quality of packaging, i.e. the quality of mechanical and electrical bonding of electronic components in particular on a chip with micro- and/or nanostructures. Such electronic components often are arranged in a layered, three-dimensional (3D) structure. In FIG. 1 several layers $4_i$ (i=1 . . . 3, 5, 7, 10 or more) are shown.

To facilitate the further description, a Cartesian x-y-z-coordinate system is used hereinafter. In FIG. 1, the x-direction points to the right, the y-direction is perpendicular to the drawing plane and points away from the viewer and the z-direction points upwards.

The layers $4_i$ are stacked in the z-direction.

The X-rays 3 are emitted from a source region 5 of an X-ray source 6 which also is mentioned as a light source. The X-rays 3 are emitted within an emission cone in which the object 2 is arranged. A typical cone angle of such emission cone is in the range between 90 deg and 175 deg and can be 170 deg. A spot size of the source region 5 can be in the range between 1 μm and 100 μm, depending on the type of the light source 6. A continuous power of the light source 6 can be in the range between 1 W and 200 W and can be, again depending on the type of the light source, 20 W or 50 W.

The X-ray source 6 can be from the type of an open transmissive source or of a liquid metal jet source. An example for an open transmissive X-ray source is a source from the product line "TCHE+" offered from X-RAY WorX GmbH, Germany. An example for a liquid metal jet source is the source "metal jet D2+70 kV" offered by Excillum AB.

The object 2 is held by an object mount 7 defining an object plane 8. The object 2 is arranged with respect to the x-y-dimensions within an object field 8a. The object mount 7 is capable to mount objects 2 having a diameter of up to 300 mm or larger.

The object mount 7 can be embodied as a ring mount to have no additional mount material between the used light path 8e and the object 2. Alternatively, the object mount 7 can include a thin organic tray or a multitude of such trays. Such organic tray functions to minimize an absorption of the used X-rays 3. Alternatively, an aluminum and/or glass tray with an appropriate dopant can be used as part of the object mount 7 to filter a low, unwanted energy part of the spectrum of the X-rays 3.

X-ray energies below 10 keV or 15 keV are filtered via a respective object mount side filter. A typical thickness of the organic tray/the aluminum and/or glass tray in a respective embodiment of the object mount 7 can be in the range between 1 mm and 5 mm.

The glass tray can contain appropriate amounts of dopants materials such as Pb, B, As, Bi, Cd, Co, U in particular to optimize the filtering of low energy X-rays.

Between the source region 5 and the object mount 7, a shield stop 8b is arranged in an arrangement plane 8c. The shield stop 8b is arranged in a general light path 8d of the X-rays 3 and serves to select a usable light path 8e within the total light path 8d defined by the emission cone of the light source 6. In particular, the shield stop 8b protects uninspected regions of the object 2 from X-ray exposure. The shield stop 8b has a stop opening 8f, which also is referred to as a shield stop aperture. Through the shield stop aperture 8f, the usable light path 8e propagates which in the further, downward beam path impinges on the object 2.

The shield stop aperture 8f is transmissive for the X-rays 3, which is used to image the object 2. Such shield stop aperture 8f can be circular, can be a square aperture or can be rectangular. Other boundaries contours of the shield stop aperture 8f are possible, e.g. a hexagonal contour.

The shield stop 8b is movable via a shield stop displacement drive 8g along at least one stop displacement direction x/y in the arrangement plane 8c.

Such movement of the shield stop 8b executed via the shield stop displacement drive 8g can be a linear displacement along at least one linear displacement direction, e.g. along x/y. Alternatively and depending on the embodiment of the shield stop displacement drive 8g, the movability of the shield stop 8b can be along two displacement directions, e.g. x and y, spanning up the arrangement plane 8c. In an alternative or additional embodiment of the shield stop displacement drive 8g, the shield stop 8b can be movable along at least one curved direction and in particular can be movable along at least one circular direction.

The shield stop 8b can be configured such that the shield stop aperture 8f is variable in size. In particular, the shield stop 8b can be configured as an iris stop with variable size of the stop opening 8f. Such stop opening size/shape variation can be effected by a respective shield stop aperture drive (not shown).

As shown in the insert FIG. 1A showing a plane xy view of the shield stop 8b, in an embodiment of the shield stop 8b, this can comprise several shield blades 8ba, 8bb, 8bc and 8bd, which together define the shield stop aperture 8f.

In the embodiment shown in FIG. 1A, the blades 8ba to 8bd are arranged in two pairs 8ba, 8bb and 8bc, 8bd of blades which define the extent of the shield stop aperture 8f from opposing sites. Viewed from the direction of FIG. 1A, the blades 8bc, 8bd are arranged below the blades 8ba, 8bb. A z distance between these blade pairs 8ba, 8bb and 8bc, 8bd can be very small and can be in the range between 1 μm and 100 μm.

As indicated by a dashed line in FIG. 1, the shield stop aperture 8f can be equipped with a filter 8h. Such filter has the function to filter out the low energy part of the x-ray spectrum coming from the source.

The detection system 1 can include a shield stop exchange mount 8i, which is indicated schematically in FIG. 1. Such shield stop exchange mount 8i has the function to exchange between different field stops 8b, in particular to exchange between shield stops 8b with different shield stop apertures 8f and/or to replace a shield stop 8b after its nominal time of use.

The material of the shield stop 8b can be from highly absorptive material, e.g. lead, tungsten alloys. A z thickness of the shield stop 8b is in the range between 100 μm and 1 mm.

The object 2 is imaged via an imaging optical arrangement 9 including an imaging optics 10 being embodied as a microscope objective. The imaging optical arrangement 9 is part of a detection assembly 11, which also includes the object mount 7 and a detection array 12 held within a detection housing 13. The detection array 12 can be a CCD or a CMOS array. The detection array 12 can be configured as a flat panel detector. The detection array 12 can have a minimum image read out time according to 10 frames per second (fps). Such image read out time can be smaller to achieve a higher fps value, in particular more than 10 fps, more than 25 fps and more than 50 fps. As a rule, the image read out time is larger than 5 ms.

The detection assembly 11 has a large field of view (FOV). The FOV depends strongly on the magnification of the used microobjective and can span a range from 70 mm for a 0.4× objective down to 0.7 mm for a 40× objective. Of course, the FOV depends on the size of the detection array 12.

The imaging optical arrangement 9 can be arranged such that the imaging optics 10 is exchangeable, in particular to switch between different magnification scales.

During a respective imaging measurement, the detection array 12, the imaging optics 10 and the object mount 7 are arranged in a fixed spatial relationship to each other. This component group 7, 10 and 12 is moved relative to the X-ray source 6 as is described further down below. For imaging/adjustment purposes, the detection array 12, the imaging optics 10 and the object mount 7 can be adjustable to each other in particular in the z-direction.

A typical distance d between the imaging optics 10 and the object 2 is in the range of 1 mm.

A typical minimum distance between the object plane 8, i.e. the arrangement plane of the object mount 7, and the arrangement plane 8c of the shield stop 8b is 1 mm. A typical minimum distance between the source region 5 of the X-ray source 6 and the shield stop 8b is in the range of 1 mm.

The resulting low distance between the source region 5 and the object 2 results in a maximum throughput of the used light path 8e. Further, such minimum distance between the object 2 and the imaging optics 10 results in a maximum resolution of the object imaging.

Further details of the imaging optical arrangement 9 hereinafter also are discussed referring to FIG. 3.

The imaging optics 10 of the imaging optical arrangement 9 serves to image a transfer field 14 in a field plane 15 into a detection field 16 in a detection or image plane 16a. Such imaging can be done according to the respective embodiment of the imaging optics 10 with a magnification of 1 or with a magnification which is larger than 1, e.g. 2, 3, 4, 5, 8, 10, 15, 20, 25, 50, 100 or even larger.

A typical magnification value can be in the range of 4 to 40.

The detector array 12 of the detection assembly 11 is arranged at the detection field 16 of the imaging optics 10. The detection array 12 can be movable with respect to the position of the image plane 16a of the imaging optics 10 along the z-direction.

At the transfer field 14 a layer 17 of scintillator material is arranged.

As a rule, the X-rays 3 from the X-ray source 6 produce a projection image on the scintillator material layer 17 via radiographically shading casting. No X-ray optics in such embodiment is present to influence a direction of the X-rays 3 within the usable light path 8e.

The thickness of such scintillator layer 17 corresponds to the z-extension of the transfer field 14 volume to be imaged by the imaging optics 10. A typical z-extension of the scintillator layer 17, i.e. a typical thickness of such layer 17, is 1 μm to 500 μm and in particular is in the range between 5 μm and 50 μm. The scintillator material layer 17 produces imaging light which can be in the near UV range, in the visible range or in the near infrared region from the X-rays 3 entering the layer 17.

Dependent on the respective embodiment, further X-ray optics can be present to image the object field 8a in the object plane 8 into the transfer field 14.

The imaging optics 10 has an optical axis 18 which also is referred to as a reference axis. The optical components of the imaging optics 10 which can be lenses and/or mirrors exhibit with respect to such reference axis 18 at least a certain degree of symmetry and in particular can exhibit rotational symmetry with respect to such reference axis. In the schematical depiction of the imaging optics 10, two of these optical components 18a, 18b are very schematically indicated.

Figure 3:
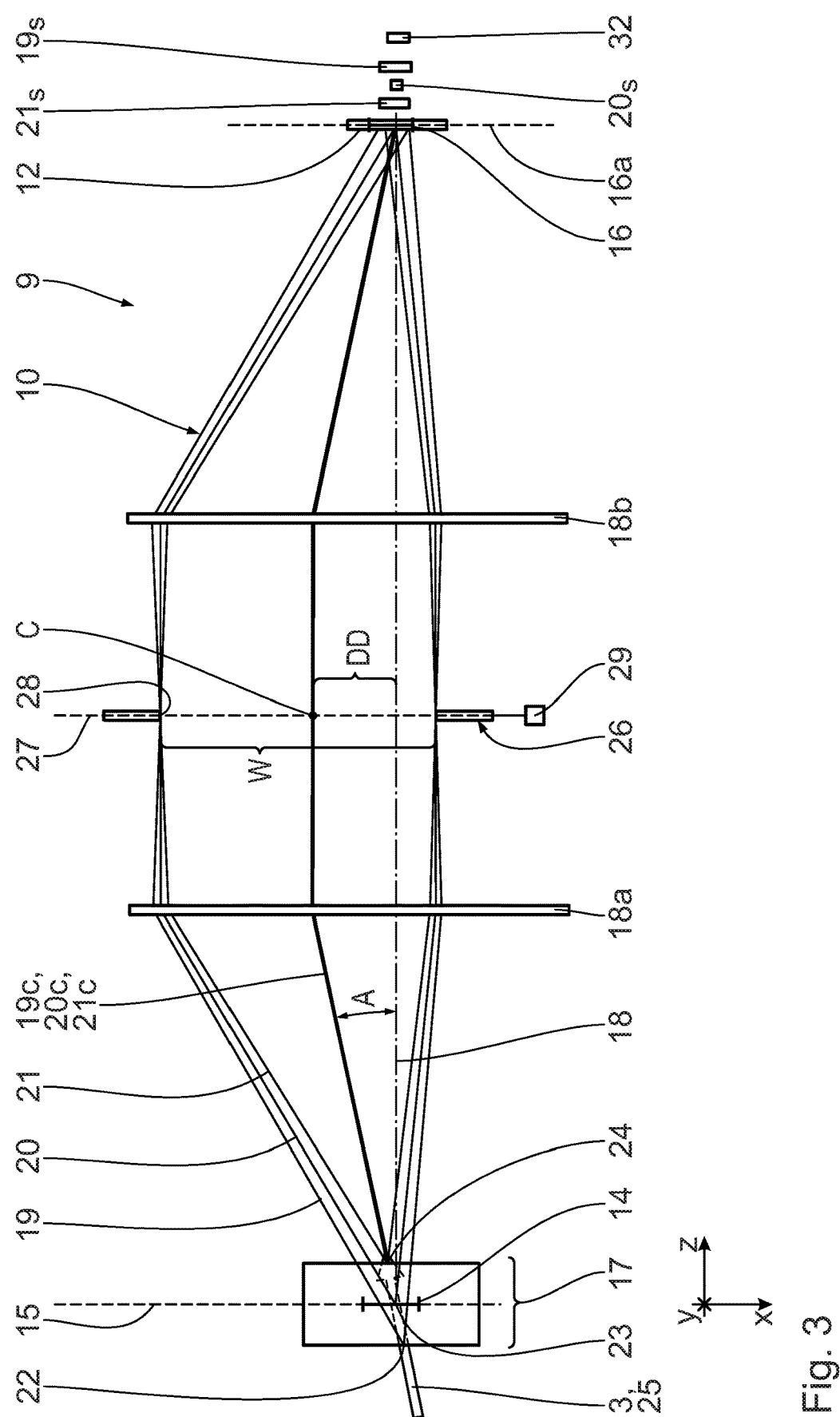
FIG. 3 in a meridional and schematic section the imaging optical arrangement with highlighted rays of an imaging beam path emerging from different points of a scintillator layer along tilted X-rays coming from the object and entering a transfer field to be imaged by the imaging objects of the imaging optical arrangement.

In FIG. 3, an imaging light path between the transfer field 14 and the detection field 16 is indicated by exemplified rays 19, 20, 21 which emerge from three different points of origin 22, 23, 24 from the scintillator layer 17. As exemplified examples of the rays 19, 20, 21 two marginal rays and a chief ray 19c, 20c, 21c are shown. The chief rays or chief imaging rays 19c, 20c, 21c of the imaging light path within the imaging optics 10 are defined as the center rays of the light bundles emanating from the respective points of origin 22, 23, 24 of the scintillator layer 17. Alternatively, such chief imaging rays 19c, 20c, 21c can be defined as those rays which carry the direction of the main imaging light energy.

Point of origin 22 is located at an entrance of an exemplified X-ray 25 from the entering X-rays 3 into the scintillator layer 17. Point of origin 23 is located at the crossing point of the X-ray 25 with the field plane 15, in particular in the middle of the z-extension of the scintillator layer 17. Point of origin 24 is located at the exit of the X-ray 25 from the scintillator layer 17.

In the beam path depicted in FIG. 3, the X-ray 25 enters the transfer field 14 at an angle A to the optical axis 18. Such angle can be in the range between 0 deg and 80 deg. As a result and as a rule, the different points of origin 22 to 24 have different x-coordinates and also, of course, different z-coordinates.

The imaging optics 10 further includes a pupil stop 26 which is arranged in a pupil plane 27 of the imaging optics 10. The pupil stop 26 defines the direction of the marginal rays of the respective ray bundles emerging from the different points of origin from the scintillator layer 17. The chief rays 19c, 20c, 21c run collinearly.

The center C of a stop opening 28 of the pupil stop 26 is arranged at a decentering distance DD with respect to the optical axis 18.

The stop opening 28 defines a pupil of the imaging optics 10. A usable object side numerical aperture (NA) of the imaging optics 10, which is defined by the stop opening 28 of the pupil stop 26, i.e. a usable object side NA, is larger than 0.4. In the embodiment shown, the usable object side NA of the imaging optics 10 can amount to 0.6. The usable object side numerical aperture can be 0.5.

The decentering distance DD is at least 10% of a typical width W, in particular of a diameter of the stop opening 28. Such ratio DD/W can be in the range between 10% and 50%, in particular in the range between 25% and 35%.

The pupil stop 26 is mounted on a drive 29. Such drive 29 is embodied as a decentering drive. Such decentering drive 29 serves to translate the pupil stop 26 in the pupil plane 27. Such translation can be done along the x-axis and the y-axis or in any direction in the x-y plane. The decentering drive 29 is in signal connection (not shown) to a control unit 30a of a control device 30 of the detection system 1 (compare FIG. 1).

The detection assembly 11 includes a lateral displacement drive 31. Such lateral displacement drive 31 serves for relative lateral displacement in the x- and/or y-direction of the object mount 7 with respect to the X-ray source 6. In the embodiment shown in FIGS. 1 and 2, the lateral displacement drive 31 is connected to the X-ray source 6. In an alternative basic configuration the source 6 remains fixed and only the detection assembly 11 including the object mount 7 holding the object 2 and the shield stop 8b move. Thus, depending on the respective embodiment, such lateral displacement drive alternatively or in addition can be connected to a frame holding in particular the object mount 7. Such frame also can hold the imaging optical arrangement 9 and in particular can hold the whole detection assembly 11.

The control unit 30a of the control device 30 further is in signal connection (not shown) with the lateral displacement drive 31. Further, the control unit 30a of the control device 30 is in signal connection (not shown) with the shield stop displacement drive 8g.

Figure 2:
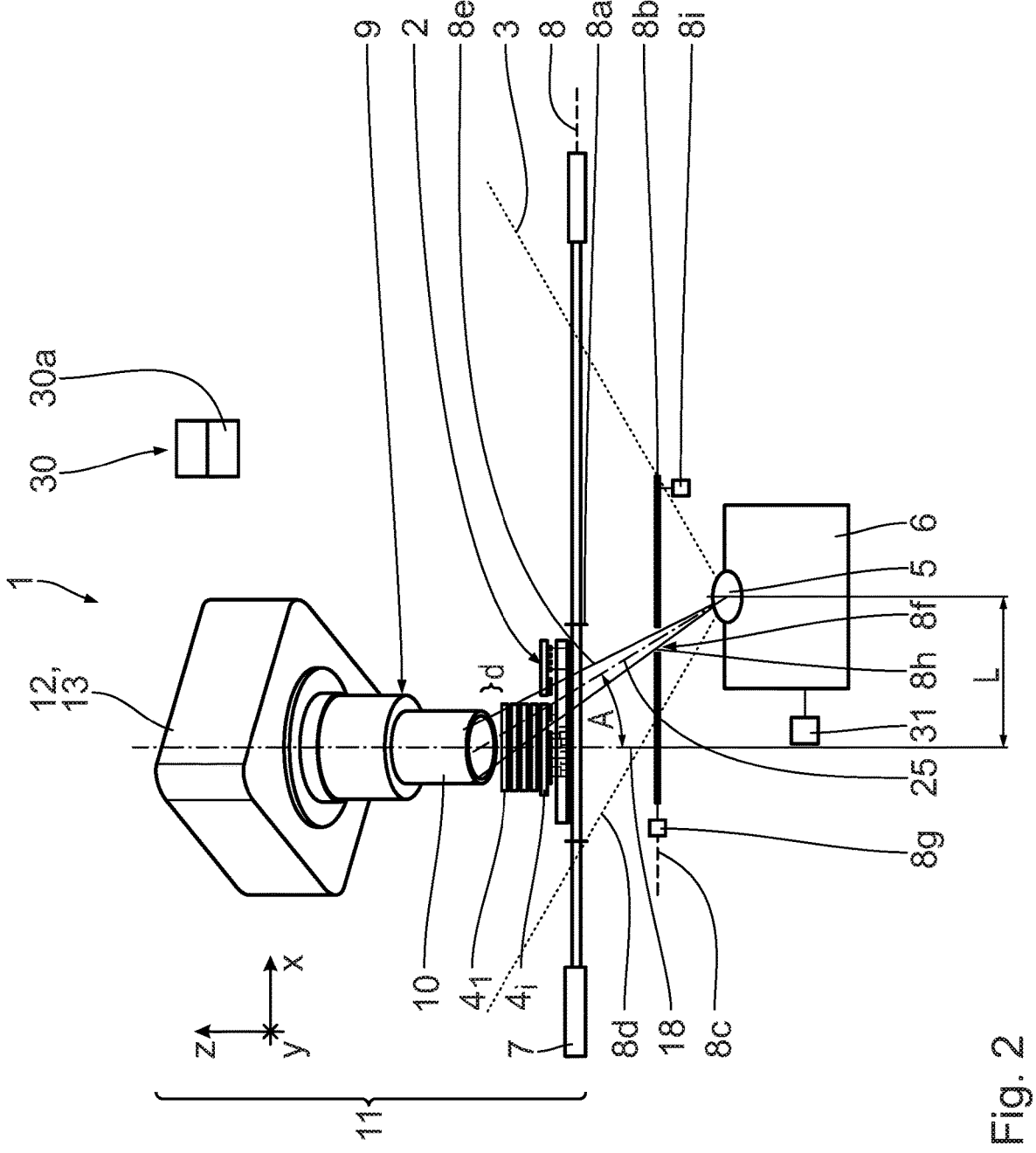
FIG. 2 in a view similar to FIG. 1 the detection system in a further position of the detection assembly including the object mount relative to the X-ray source which compared to FIG. 1 is laterally displaced.

FIG. 2 shows the effect of the lateral displacement drive 31. Compared to FIG. 1, the X-ray source 6 is displaced in positive x-direction relative to the detection assembly 11. As mentioned above, such x-displacement can be caused by a lateral displacement drive (not shown) displacing the whole detection assembly 11 and/or by the lateral displacement drive 31 displacing the X-ray source 6. Due to its effect to laterally displace the object mount 7, the lateral displacement drive 31 also is referred to as an object displacement drive. This results in an oblique illumination of the object 2 with the X-rays 25 according to the angle A explained above with respect to FIG. 3. In contrast, in the initial configuration of the X-ray source 6 according to FIG. 1, such X-rays 25 run along the z-direction, i.e. impinge perpendicularly on the object plane 8. By the effect of the lateral displacement drive 31, the object mount 7 is movable relative to the light source 6 along at least one object displacement direction x/y in the object plane 8. Such movability of the object mount 7 via the lateral displacement drive 31 can be along at least one linear displacement direction x and/or y. In an alternative or additional embodiment, the object mount 7 can be movable via the lateral displacement drive 31 or a respective lateral displacement drive acting on the object mount 7 along at least one circular direction relative to the light source 6. Such circular direction in FIG. 1 schematically is represented by an arrow C. As an alternative or an addition a movement is possible along an arbitrary path in two dimensions. Such arbitrary path also can run along a 3D path.

As shown schematically in FIG. 2, in accordance with the lateral movement of the X-ray source 6 relative to the detection assembly 11, the shield stop 8b also is laterally displaced via the shield stop displacement drive 8g to ensure that the used light path 8e of the X-rays 3 impinges on that part of the object to be imaged by the detection system 1. Doing so, the movements of the shield stop displacement drive 8g, of the lateral displacement drive 31 and also of the pupil stop displacement drive 29 are synchronized via the control unit 30a of the control device 30.

The lateral displacement L (compare FIG. 2) of the X-ray source 6 with respect to the object mount 7 and the further components of the detection assembly 11 on the one hand and the decentering distance DD of the center C of the stop opening 28 with respect to the optical axis 18 of the imaging optics 10 on the other are balanced such that the X-rays 25 entering the transfer field 14 run parallel to the chief rays 19c, 20c, 21c.

The control unit 30 serves to control the decentering drive 29 of the pupil stop 26 and the shield stop displacement drive 8g depending on the lateral displacement of the X-ray source 6 effected by the lateral displacement drive 31. Such corresponding drive amount triples of (1) the decentering drive 29, of (2) the shield stop displacement drive 8g and of (3) the lateral displacement drive 31, which result (1) in a balancing of the X-ray 25 direction through the center of the shield stop aperture 8f and (2) in a balancing of the X-ray 25 direction parallel to the chief rays 19c to 21c direction, can be stored in a look-up table of the control device 30.

The detection system 1 is operated as follows:

In the initial configuration according to FIG. 1, the X-rays, which can be in the typical x-ray band and can have energies between 10 keV and 160 keV, produce an object image in the transfer field 14 and are converted by the scintillator layer 17 to a wavelength range in particular in the near UV range, in the visible range or in the near infrared region, which is detectable by the detection array 12. Such converted imaging rays, e.g. the imaging rays 19 to 21, then are imaged via the imaging optics 10 onto the detection array 12 thereby producing an image of the transfer field 14 in the detection field 16 and thereby producing an image of the object 2 on the detection array 12.

By using a method described in DE 10 2018 209 570 A1, different object imaging projections are utilized via the lateral displacement of the X-ray source 6 as explained above. By doing so, a very small distance between the entrance of the imaging optics 10, i.e. the scintillator layer 17 and the nearest layer 4₁ of the object 2 is ensured in order to minimize transfer errors from the object 2 to the transfer field 14. The minimum distance d (compare FIG. 1) can be in the range of 1 mm. Due to this minimum distance d, when laterally displacing the X-ray source 6 with respect to the detection assembly 11, no tilt of the optical axis 18 with respect to the z-axis is possible to adapt the imaging optics 10 to the oblique illumination by the X-rays 25. This results in the angle A explained above. The use of the decentered pupil stop 26 ensures the image produced in the detection field 16 is not compromised due to such obliquely entering X-rays 25, which produce points of origins of the imaging rays 19 to 21 produced in the scintillator layer 17 along a respectively oblique path (compare points of origin 22 to 24 in FIG. 3). The balancing of the decentering distance DD with the lateral displacement L results in a small mean effective spot size 19ₛ, 20ₛ, 21ₛ as exemplified shown with the spot images of the points of origin 22 to 24 in FIG. 3. An effective spot size 32 as depicted in FIG. 3 on the right-hand sight as a result is small. Such spot size can be calculated as the distance of the first airy root from the center of the respective airy disc. In particular in the x-dimension, due to the decentered stop opening 28 of the stop 26, the effective spot size 32 can be by a factor 1, 2 to 3 and in particular by a factor in the range between 1.5 and 2.5, in particular in the range around 2 smaller than an uncorrected spot size with a centered stop.

For example, using an object side numerical aperture of 0.4 defined by the stop opening 28 of the stop 26 and further using a wavelength of the imaging rays 19 to 21 of 400 nm, an effective spot size in the x- and in the y-direction can result, which is in the range of 1 m (FWHM or full width at half maximum). Here, an angle A of the X-rays 25 to the optical axis 18 of 45° was used.

Further, the use of the shield stop 8b ensures that only that X-rays 3 passes the arrangement plane 8c, which is needed to illuminate the object 2 via the used light path 8e. This avoids unnecessary X-ray load on the object 2 and also on the components of the detection assembly 11.

A nominal object side numerical aperture (NA) of the imaging optics 10, which might be usable without constriction of the decentered pupil stop 26, is larger than the object side numerical aperture as defined by the stop opening 28. For example, in case of a width W of the stop opening 28 resulting in a usable object side numerical aperture of 0.6 and further in case of the angle A amounting to 20 deg, such nominal object side numerical aperture of the imaging optics 10 is (sin 20 deg=0.34) 0.6+0.34, i.e. is 0.94.

Larger nominal object side numerical apertures are possible by using immersion imaging optics 10. Examples and references for such further imaging optics are given in U.S. Pat. No. 7,057,187, the entire content of which is incorporated by reference. For example, the nominal object side numerical aperture of the imaging optics 10 can be up to 1.9.

U.S. Pat. No. 7,057,187 further gives examples for scintillating materials which can be used for the scintillating layer 17. A preferred material is CsI, having a refractive index of 1.95. Other scintillating material having refractive indices between 1.50 and 2.20 also can be used.

Possible scintillator materials for the scintillating layer 17 are NaI:Tl, CsI:Tl, CsI:Na, CsI, $BaF_2$, $CeF_3$, BGO, PWO:Y, LSO/LYSO or perovskites such as $CsPbBr_3$ and $CsPbI_3$.

Figure 4:
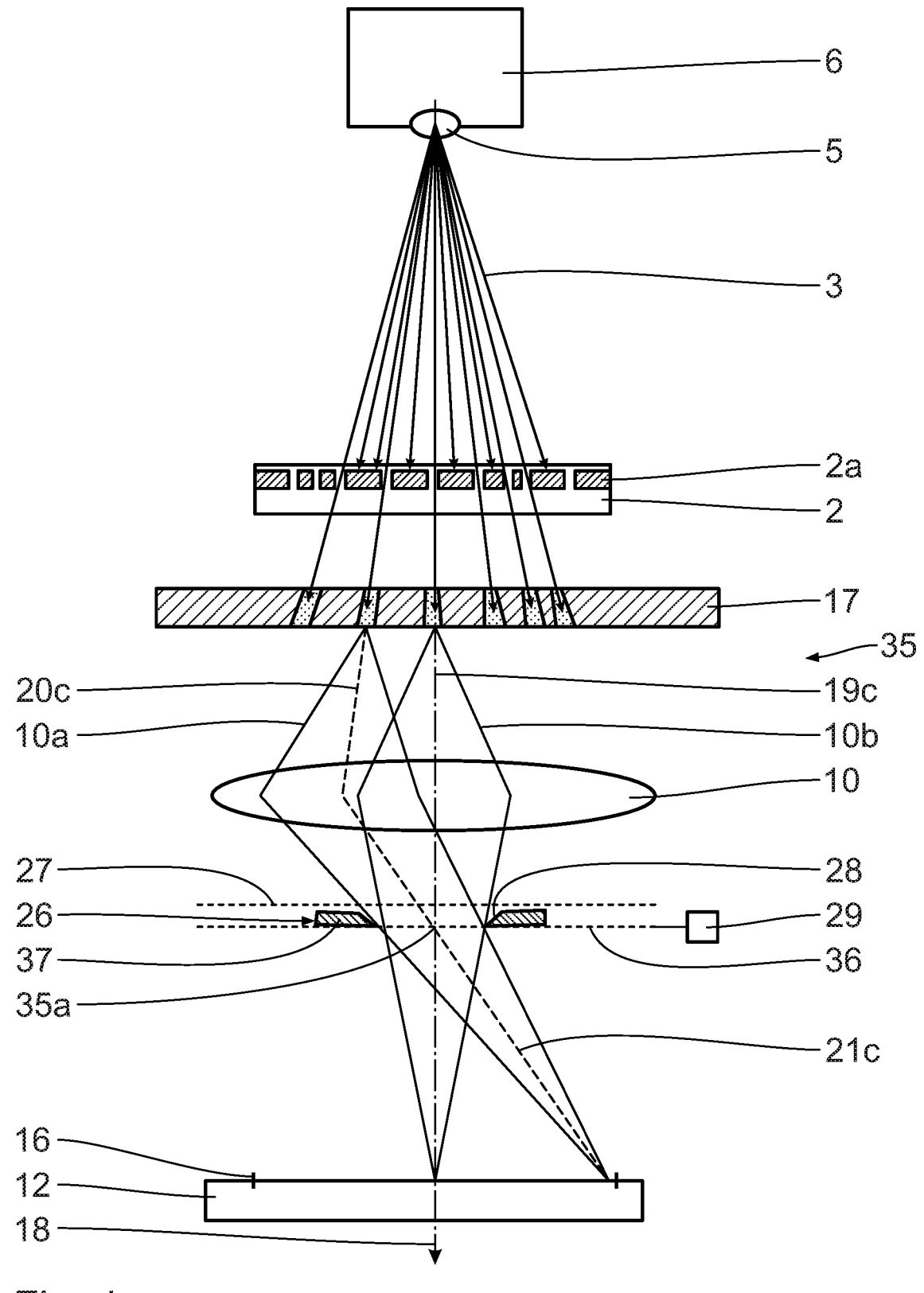
FIG. 4 a further embodiment of the imaging optical arrangement including an axially displaceable pupil stop and an imaging optics to image a transfer field into a detection field.

FIG. 4 illustrates a further example of an imaging optical arrangement 35 which may be used as an alternative to the imaging optical arrangement 9 discussed above. Components and functions which correspond to those explained above with respect in particular to FIGS. 1 to 3 are denoted with the same reference numerals and are not discussed in detail again.

In the FIG. 4 embodiment, the drive 29 of the pupil stop 26 is embodied as an axial drive to translate the stop perpendicular to the pupil plane 27.

The sample 2, for example a semiconductor sample comprising regions or structures 2a of different density, is irradiated by the X-ray radiation 3. The X-ray radiation 3 originates from the X-ray source 6. The X-ray source 6 can either be real or be configured as a virtual X-ray source 6, e.g. an intermediate focus. From the X-ray source 6, a homocentric bundle of the X-rays 3 is propagating and irradiating the sample 2. The x-rays 3 are partly absorbed by the sample 2 or traverse the sample 2 without being deflected and impinge on the scintillator layer 17. The scintillator layer 17 converts the X-rays 3 into for example visible light. In order to convert many x-ray photons to visible light, the scintillator 17 has a minimum thickness of about 1 μm to 500 μm. Such thickness of the scintillator layer 17 depends on the numerical aperture of the imaging optics 10 which is schematically depicted by a lens in FIG. 4. The thickness of the scintillator layer 17 should be a few Rayleigh units. Typically, the thickness of the scintillator layer 17 is selected between 10 and 200 μm.

In addition to the explanation given above with reference to the embodiments of FIGS. 1 to 3, with the finite thickness of the scintillator 17, it is maintained that a sufficient number of X-rays 3 is converted into visible light. Further, the excited regions within the scintillator 17 are elongated along the x-ray trajectories inside the thick scintillator 17 and thus have a different orientation or tilt angle inside the scintillator 17, depending on the lateral position. The light photons from the excited regions are imaged by the imaging optics 10 on a detection field 16 of the detection array 12. The imaging optics 10 is configured to form an enlarged image of the scintillator 17 onto the detection array 12.

According to an embodiment of the invention, a telecentricity property of the imaging optics 10 is configured according to the projection direction of the X-rays 3, which originate from the X-ray source 6. The telecentricity property of the imaging optics 10 is adjusted such that an image 35a of the X-ray source 6, if it were to be formed by the imaging optics 10, is formed at the center of the pupil stop 26 which acts as a telecentricity stop. With telecentricity property, here generally the direction of the chief rays 19c, 20c, 21c at the scintillator 17 is described, although the direction might not be telecentric in a mathematical sense. A bundle of the chief rays 19c, 20c, 21c might also be homocentric.

According to the FIG. 4 embodiment, the telecentricity property of the imaging optics 10 is adjusted such that the chief rays 19c, 20c, 21c form a homocentric bundle with the X-ray source 6 as virtual origin or intersection point of the chief rays 19c, 20c, 21c. The chief rays 19c, 20c, 21c are those rays, which intersect the aperture stop 26 at the center position of the aperture 8f, i.e. of the stop opening 28.

With this configuration of chief rays 19c, 20c, 21c arranged according to the projection direction of the X-rays 3, an image of the excited regions along the projection direction of the X-ray 3 with high resolution is achieved. Imaging beam bundles 10a, 10b imaged by the imaging optics 10 are exemplified in FIG. 4.

The arrangement of the chief rays 19c, 20c, 21c according to the projection direction of the X-rays 3 can be achieved by an embodiment of the imaging optics 10 specifically designed for a homocentric bundle of the chief rays 19c, 20c, 21c. In an example, the imaging optics 10 comprises means for adjusting the chief ray property, for example by movable optical elements, such as in a zoom system configured to change a telecentricity property of the chief rays 19c, 20c, 21c in the vicinity of the field plane 15, i.e. the arrangement plane of a layer 17 of scintillator material. In the FIG. 4 example, a variation of the telecentricity property of the chief rays 19c, 20c, 21c is achieved by the moveable pupil stop 26. In the FIG. 4 example, the movable pupil stop 26 can be moved via the axial drive 29 along the optical axis 18, whereby a chief ray property is changed in accordance with an axial distance of an X-ray source 6. The drive 29 in this example acts as an axial drive to translate the pupil stop 26.

In FIG. 4, the pupil 26 is shown in a monocentric stop position which axially is displaced with respect to the pupil plane 27. When the pupil stop 26 is translated from such monocentric stop position (i.e. from plane 36 into the pupil plane 27), a telecentric stop position of the pupil stop 26 is achieved.

Figure 5:
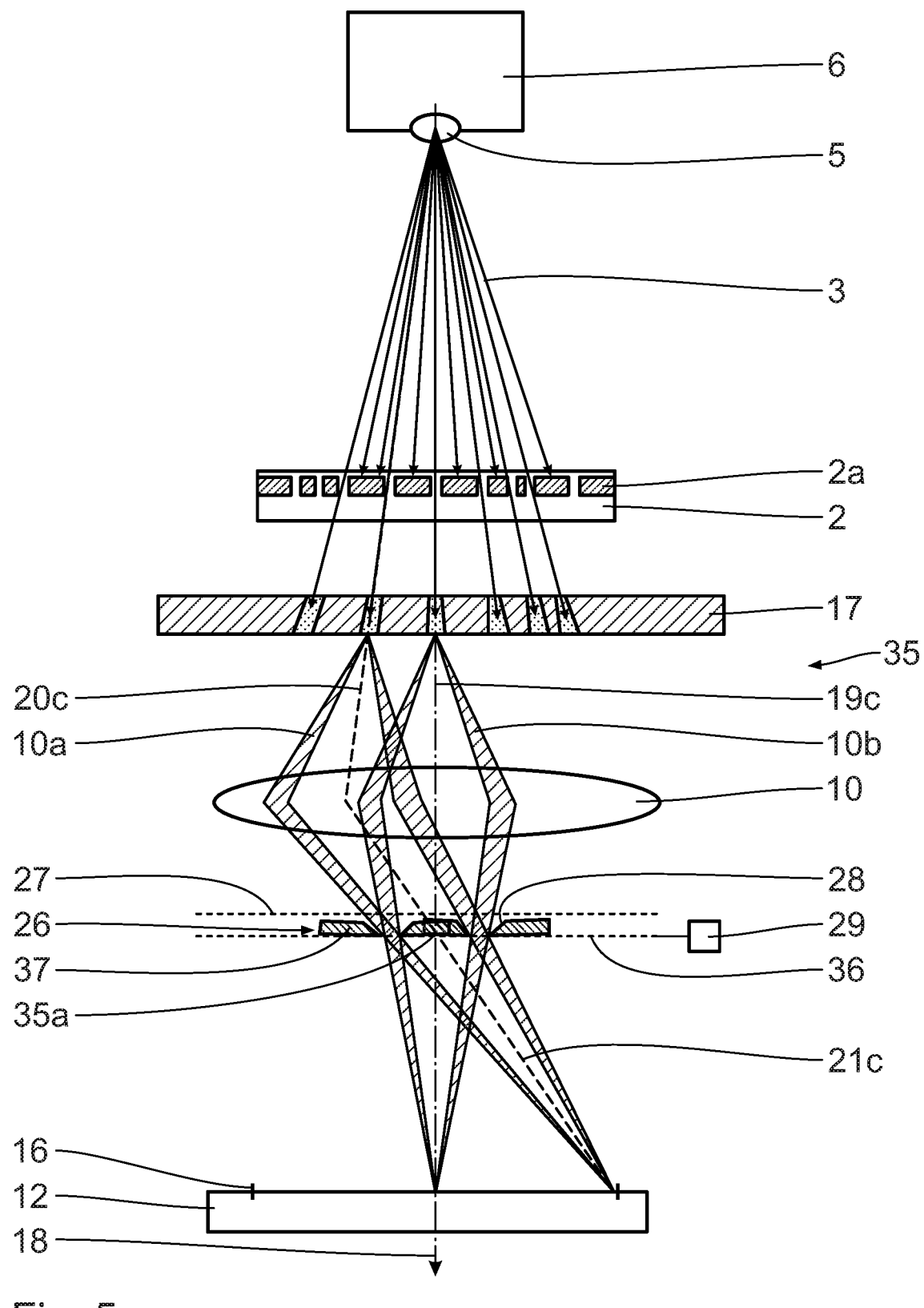
FIG. 5 in a view similar to FIG. 4 the imaging optical arrangement wherein the pupil stop is embodied as an annular aperture stop.

A resolution of the optical imaging with the imaging optics 10 can further be improved by using instead of the pupil stop 26 according to FIGS. 1 to 4 an annular pupil stop 37. Such an example is illustrated in FIG. 5. Components and functions corresponding the those explained above in particular with reference to FIGS. 1 to 4 are denoted with the same reference numerals and are not discussed in detail again.

Using the annular pupil stop 37 limits the imaging beam bundles 10a, 10b to annular beam bundles, which allow a larger depth of field and thus an imaging with the elongated excited regions of the scintillator 17 with higher lateral resolution. The annular pupil stop 37 also is embodied as an axially driveable stop driven with the drive 29, as illustrated in FIG. 5.

The respective stop 8b, 26, 37 can be embodied to be exchangeable, and the optical imaging optics 10 can be configured with several, exchangeable and movable stops, including for example a circular and an annular stop.

Figure 6:
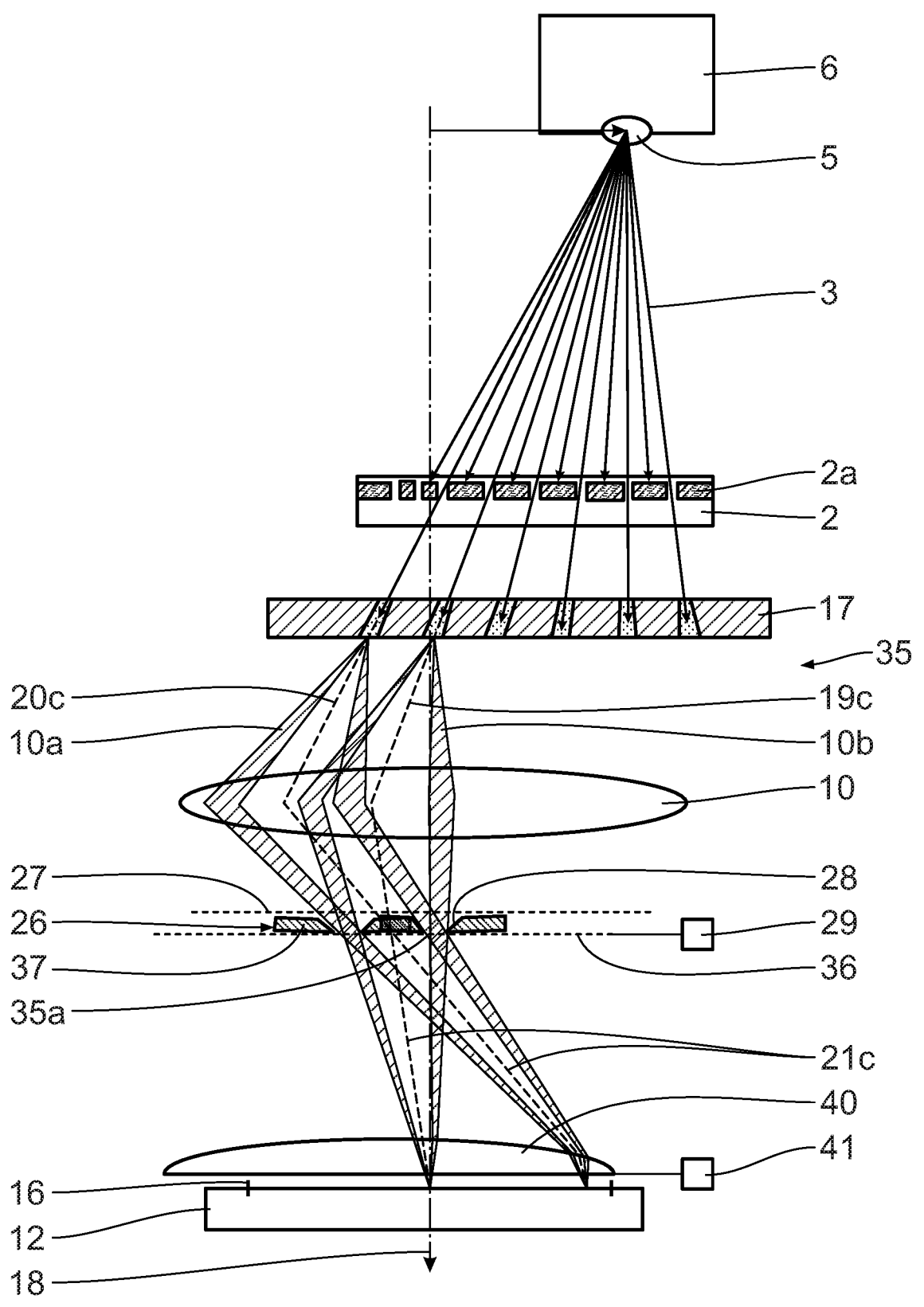
FIG. 6 in a view similar to FIG. 5 the imaging optical arrangement wherein the pupil stop further is decentered, i.e. laterally displaced from an optical axis of the imaging optical arrangement.

In another example, the movable stop can be laterally displaced from the optical axis, whereby a chief ray property is changed in accordance with an axial distance of an x-ray source with respect to the optical axis of the imaging optics 10. An example is illustrated in FIG. 6. Components and functions corresponding the those explained above in particular with reference to FIGS. 1 to 5 are denoted with the same reference numerals and are not discussed in detail again.

In the FIG. 6 embodiment of an imaging optical arrangement 35, the pupil stop 37 is driven by the drive 29 in a position which is decentered with respect to the optical axis

18 and further is axially displaced with respect to the pupil plane 27. In the FIG. 6 embodiment, the drive 29 includes a decentering drive unit and further an axially drive unit.

With respect to the function of such decentering drive, it is referred in particular to the description above given with respect to the embodiment of FIGS. 1 to 3.

In the embodiments of FIGS. 4 and 5, the imaging optics 10 is illustrated simplified by a single lens. It is understood the imaging optics 10 can comprise several lens elements or several groups of lens elements or can be comprising several sub-systems of optical components, for example a microscope lens and a tubus lens. The imaging optics 10 can comprise a zoom system which serves to vary the magnification of the imaging optics 10.

The imaging optics 10 can further comprise at least a field lens 40 arranged in proximity to the detector array 12 or the scintillator layer 17. In the FIG. 6 example, the field lens 40 is arranged in proximity to the detection array 12. With the field lens 40, an angle of incidence with respect to the image sensor can be reduced. In an example, the field lens 40 is configured to be displaceable in lateral direction via a respective decentering drive 41. Thereby, a chief ray property according to an off-axis X-ray source position (with respect to the optical axis 18 of the imaging optics 10) can be compensated.

While this specification contains many implementation details, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. The separation of various system components in the embodiments described above should not be understood as requiring such separation in all embodiments. Moreover, although features can be described above as acting in certain combinations and even initially claimed as such, one or more features from a claimed combination can in some cases be excised from the combination, and the claimed combination can be directed to a subcombination or variation of a subcombination.

Thus, particular embodiments of the invention have been described. Other embodiments are within the scope of the following claims. In addition, the actions recited in the claims can be performed in a different order and still achieve desirable results.

What is claimed is:

1. A detection system for an X-ray inspection of an object, the detection system comprising:
   an X-ray source for generating X-rays,
   an object mount to hold the object,
   an object displacement drive, wherein the object mount is movable relative to the X-ray source via the object displacement drive along at least one lateral object displacement direction in the object plane,
   a layer of scintillator material arranged in a transfer field, wherein X-rays from the X-ray source produce a projection image on the layer of scintillator material via radiographically shading casting,
      an imaging optics to image the transfer field into a detection field in a detection plane,
      at least one stop being movable via a stop displacement drive, and a control device with a drive control unit being in a signal connection with the at least one of stop displacement drive and the object displacement drive for synchronizing a movement of the stop displacement drive and a movement of the object displacement drive.

2. The detection system of claim 1, wherein an object side numerical aperture of the imaging optics which is defined by the stop opening is larger than 0.4.

3. The detection system of claim 1, wherein an angle between the X-rays entering the transfer field and an optical axis of the imaging optics is between 0 deg and 80 deg.

4. The detection system of claim 1, wherein the object mount and/or the at least one stop is movable along at least one linear displacement direction.

5. The detection system of claim 1, wherein the object mount and/or the at least one stop is movable along at least one circular direction.

6. The detection system of claim 1, wherein the at least one stop is configured such that the stop aperture is variable in size.

7. The detection system of claim 1, further comprising at least one stop exchange mount to exchange between different stops.

8. The detection system of claim 1, wherein no X-ray optics is present to influence a direction of the X-rays between the X-ray source and the layer of scintillator material.

9. The detection system of claim 1, wherein the control device has a lookup table configured to store data with respect to a dependency between actions of the stop displacement drive and actions of the object displacement drive.

10. The detection system of claim 9,
wherein the control device is configured to use the data stored in the lookup table to control the stop displacement drive and the object displacement drive.

11. The detection system of claim 1, wherein the X-ray source is an open transmissive source or a liquid metal jet source.

12. The detection system of claim 1, wherein the at least one stop is a shield stop having a shield stop aperture transmissive for the X-rays, the shield stop being arranged in an X-ray path of X-rays between the X-ray source and the object mount, the shield stop being movable via the stop displacement drive along at least one displacement direction.

13. The detection system of claim 1, wherein the at least one stop is arranged in a pupil plane of the imaging optics and forming a pupil stop.

14. The detection system of claim 13, wherein a center of a stop opening of the pupil stop is arranged at a decentering distance with respect to an optical axis of the imaging optics.

15. The detection system according to claim 14, wherein the stop displacement drive is configured as a decentering drive to translate the pupil stop in the pupil plane.

16. The detection system of claim 14, wherein the decentering distance is at least 10% of a width of the stop opening.

17. The detection system of claim 14, wherein
a lateral displacement of the X-ray source with respect to the object mount and
the decentering distance of the center of the stop opening are balanced such that X-rays entering the transfer field run parallel to chief imaging rays of imaging light within the imaging light path.

18. The detection system of claim 13, wherein the stop displacement drive is configured to axially move the pupil stop.

19. The detection system of claim 13, wherein the imaging optics includes a movable optical element.

20. The detection system of claim 13, wherein the stop is an annular pupil stop.

21. An X-ray inspection method using a detection system of claim 1, comprising moving the stop synchronously relative to the object to be inspected to realize different object imaging projections.

22. The X-ray inspection method of claim 21, wherein the at least one stop is arranged in a pupil plane of the imaging optics and forming a pupil stop,
wherein a center of a stop opening of the pupil stop is arranged at a decentering distance with respect to an optical axis of the imaging optics, and
wherein the decentering distance of the stop opening of the pupil stop is adapted to an angle of an oblique or tilted entry of X-rays to the transfer field of the imaging optics.

23. The X-ray inspection method of claim 22, comprising balancing a lateral displacement of the X-ray source with respect to the object mount and the decentering distance of the center of the stop opening with respect to the optical axis of the imaging optics such that X-rays entering the transfer field run parallel to chief imaging rays of imaging light within the imaging light path.

24. The X-ray inspection method of claim 22, comprising reading data from a lookup table that stores data with respect to a dependency between actions of the stop drive and actions of the object displacement drive, and
using the data from the lookup table to balance the lateral displacement of the X-ray source with respect to the object mount and the decentering distance of the center of the stop opening of the stop with respect to the optical axis of the imaging optics.

25. The detection system of claim 1, wherein the X-ray source is for generating X-rays having energies in the range between 10 keV and 160 keV.

26. The detection system of claim 1, wherein the imaging optics has a magnification of 1 or greater.

27. A detection system including a detection assembly comprising: an imaging optical arrangement to image an object illuminated by X-rays, the imaging optical arrangement comprising
an imaging optics to image a transfer field in a field plane into a detection field in a detection plane via an imaging light path,
a layer of scintillator material arranged at the transfer field, and
a stop being arranged in a pupil plane of the imaging optics,
wherein the imaging optics has an optical axis,
wherein the imaging optical arrangement further comprises a movable optical element for adjusting a property of a chief ray,
the detection assembly further comprising
a detection array arranged at the detection field of the imaging optics, and
an object mount to hold an object to be imaged via the imaging optics,
the detection system further comprising an X-ray source.

28. The imaging optical arrangement of claim 27, wherein a center of a stop opening of the stop is arranged at a decentering distance with respect to the optical axis.

29. The imaging optical arrangement of claim 28, wherein the decentering distance is at least 10% of a width of the stop opening.

30. The imaging optical arrangement of claim 27, wherein the stop is mounted on a drive to translate the stop in the pupil plane.

31. The imaging optical arrangement of claim 27, wherein an object side numerical aperture of the imaging optics which is defined by the stop opening is larger than 0.4.

32. The imaging optical arrangement of claim 27, wherein the stop is an annular pupil stop.

33. The detection system of claim 27, wherein an angle between the X-rays entering the transfer field and the optical axis of the imaging optics is between 0 deg and 80 deg.

34. The detection system of claim 27, comprising a lookup table that stores data with respect to a dependency between actions of the optical element drive and actions of the lateral displacement drive, wherein the control device is configured to use the data stored in the lookup table to control the optical element drive and the lateral displacement drive.

35. The detection system of claim 27, further comprising an optical element drive to translate the movable optical element and a control device being in signal connection with the optical element drive and with an object displacement drive to move the object mount along at least one lateral object displacement direction in the object plane.

36. The detection system of claim 27, wherein the X-ray source is for generating X-rays having energies in the range between 10 keV and 160 keV.

37. The detection system of claim 27, wherein the imaging optics has a magnification of 1 or greater.

38. The detection system of claim 27, having a lateral displacement drive for relative lateral displacement of the object mount with respect to the X-ray source.

39. A detection system including a detection assembly comprising:

an imaging optical arrangement to image an object illuminated by X-rays, the imaging optical arrangement comprising an imaging optics to image a transfer field in a field plane into a detection field in a detection plane via an imaging light path, a layer of scintillator material arranged at the transfer field, and a stop being arranged in a pupil plane of the imaging optics, wherein the imaging optics has an optical axis, wherein the imaging optical arrangement further comprises means to axially move the stop for adjusting a chief ray property, the detection assembly further comprising a detection array arranged at the detection field of the imaging optics, and an object mount to hold an object to be imaged via the imaging optics, the detection system further comprising an X-ray source.

40. The imaging optical arrangement of claim 39, comprising an axial pupil stop drive to translate the stop perpendicular to the pupil plane.

41. The imaging optical arrangement of claim 40, wherein the axial drive serves as a telecentricity adjustment drive to adjust a telecentricity parameter of the imaging optical arrangement.

* * * * *